March 19, 1929.  R. R. WILLIAMS  1,705,949
INSULATED CABLE
Filed Nov. 12, 1923
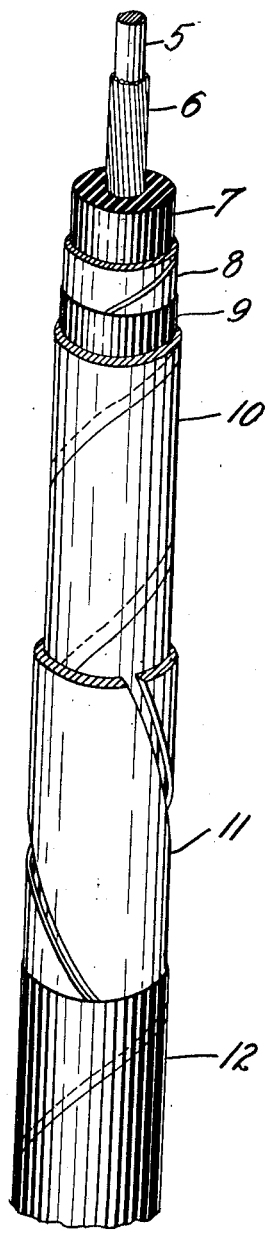
Inventor:
Robert R. Williams
by Ewadam Atty Patented Mar. 19, 1929.

1,705,949

UNITED STATES PATENT OFFICE.

ROBERT R. WILLIAMS, OF ROSELLE, NEW JERSEY, ASSIGNOR TO WESTERN ELECTRIC COMPANY, INCORPORATED, OF NEW YORK, N. Y., A CORPORATION OF NEW YORK.

INSULATED CABLE.

Application filed November 12, 1923. Serial No. 674,161.

This invention relates to insulated cables and particularly to such a cable in which the insulating material consists of a rubber compound.

The principal object of the invention is to prevent deterioration of the cable insulation resulting in a lowering of its dielectric or mechanical properties.

A further object is to prevent excessive corrosion of the metallic conductors or sheath.

The principal feature of the invention consists in separating the rubber insulating material of the cable from the metallic conductors by means of a suitable material which will prevent the sulphur in the insulation from affecting the metallic members and which will also prevent the metallic salts from deleteriously affecting the dielectric or mechanical properties of the insulation.

As a result of recent investigations, it is now possible to build a submarine cable employing a rubber composition for the insulating material in which cable the electrical constants compare very favorably with those of cables employing gutta percha as the insulating material. However, with the rubber insulated cable, difficulty may arise in case it is desired to employ a construction in which the insulated conductor is surrounded by a copper or other metallic sheath which is in direct contact with the sea water and serves to provide a better sea return, and to prevent the destructive boring of the teredo or other insects. If the metallic sheath comes in direct contact with the rubber insulation and with the sea water, excessive corrosion is liable to start at once, the sulphur in the rubber insulation acting upon the metallic sheath to form metallic salts which in turn react upon the rubber insulation causing the rapid deterioration of both sheath and insulating material and resulting in a lowering of the mechanical and dielectric properties of the insulation.

In accordance with the present invention, the rubber insulation is not allowed to come into direct contact with the metallic sheath but is separated therefrom by a material which is not affected by the sulphur in the rubber and which does not set up corrosion of the metallic sheath.

This invention may be more clearly understood by reference to the accompanying drawing, which is a view of a section of cable embodying the features of this invention, portions of the various layers being removed to better show the construction.

Referring to the drawing, the conductor which may consist of a central wire 5, which is tinned to prevent corrosion, is surrounded by a plurality of small tinned wires 6, 6 and is covered with a heavy layer of rubber compound 7 which is formed thereabout in the manner well understood in the art. A fabric tape 8 is wrapped around the rubber covered core which is then wound on a reel, placed in an oven and subjected to vulcanizing temperatures and in some instances to the presence of steam. The preferred method of vulcanizing this cable core is described in detail in my Patent No. 1,543,890, issued June 30, 1925. The vulcanized core is then supplied with a coating of liquid bitumen 9 and thereafter covered with thin copper protective tape 10. Outside of the protective tape are wrapped two relatively heavy copper conducting tapes 11—11 and a wrapping of impregnated adhesive fabric tape 12 is applied over the conductive tapes. The thin copper tape 10, which is served with an overlap to provide a complete metallic shield, acts as a protective tape to prevent crushing of the core when wrapping thereabout the heavy conducting tapes 11—11, and also prevents destruction of the insulation by the teredo or other worms or insects. After the cable core has been constructed as described it is preferably protected from damage by wrapping with layers of jute and steel armoring wires in the manner commonly used in armoring submarine cables.

Since the protective tape 10 and the conducting tapes 11—11 are in direct contact with the sea water, it is essential that special care be taken to prevent excessive corrosion, particularly that due to electrolytic action. If the rubber is in direct contact with the copper tape, the sulphur of the rubber reacts on the copper to form copper salts which, in turn, react upon the rubber, this action being hastened materially by the presence of sea water and resulting in rapid deterioration of the insulating material both as regards its mechanical and dielectric properties and also in excessive corrosion of the copper tapes.

In order to satisfactorily prevent excessive corrosion the material used to separate the metallic conductor from the rubber insulation should not only be of such character as not to combine chemically with the metallic conductor or the insulating material but should also be of such character that it will not readily mix with the insulating material. A material which has been found to be satisfactory for this use is a liquid bitumen consisting largely of malthene of natural origin and so refined as to be free from appreciable matter volatile below 200° C.

The invention claimed is:

1. A signaling cable comprising a central conductor, a body of rubber insulating material surrounding said conductor, a thin coating of liquid bitumen over said insulating material, and a copper tape wrapped helically about said coating.

2. A submarine cable comprising a central conductor having a body of rubber insulating material formed thereabout, a copper conductor wrapped about the insulating material, and means for preventing metallic salts formed by the action of the sea water upon the copper conductor from deleteriously affecting the dielectric and mechanical properties of the insulating material, said means comprising a layer of liquid bitumen separating the insulating material from the metallic conductor, said liquid bitumen consisting largely of malthene which is so refined as to be free from appreciable matter volatile below 200° C.

3. An armored signaling cable comprising a central conductor surrounded by an insulating material including vulcanized rubber, a copper tape wrapped helically about said insulating material, and means for protecting said copper tape and said insulating material from the effect of corrosion in the presence of water comprising a coating of a material which is liquid at room temperatures, said means separating said copper tape from said insulating material.

4. A signaling cable comprising a conducting core having a body of vulcanized rubber formed thereabout, a coating over said rubber of a bitumen which may be applied without heating, and a sheath of copper placed about said coating.

5. A signaling cable with concentric conductors comprising a central conductor surrounded by a layer of vulcanized rubber, a second conductor forming a sheath of copper placed about said layer of rubber, and means for preventing corrosion of said sheath of copper due to the presence of sulphur and sea water comprising a thin coating of a bitumen which may be applied without deleterious effect upon the insulating characteristics of the rubber and separating said sheath from said rubber.

6. An armored submarine signaling cable comprising a conductor surrounded by a layer of vulcanized rubber, a conducting sheath formed by wrapping one strip of copper helically about said layer of rubber, a separator between said layer and said sheath comprising a material characterized by a consistency such that it may be applied without heating and by inertness in the presence of sulphur and sea water, said separator forming a coating which does not appreciably increase the overall diameter of the cable.

7. A submarine signaling conductor comprising a stranded conductor, a layer of vulcanized rubber compound formed thereabout, a tape of fabric wound about said layer, a neutral separator forming a thin coating about said wound tape and consisting of liquid bitumen with a large percentage of malthene, a thin protecting sheath of copper about said coating for preventing deformation thereof, a conducting sheath formed by wrapping at least one copper strip about said protecting sheath, a tape of impregnated fabric wound about said conducting sheath.

In witness whereof, I hereunto subscribe my name this 5 day of November A. D., 1923.

ROBERT R. WILLIAMS.